United States Patent
Engelhardt et al.

[15] 3,697,544
[45] Oct. 10, 1972

[54] THIAXANTHONE-10,10-DIOXIDES

[72] Inventors: Edward L. Engelhardt, Gwynedd Valley; David C. Remy, North Wales, both of Pa.

[73] Assignee: Merck & Co., Inc., Rahway, N.J.

[22] Filed: March 19, 1970

[21] Appl. No.: 21,795

Related U.S. Application Data

[62] Division of Ser. No. 661,784, Aug. 21, 1967, Pat. No. 3,530,116.

[52] U.S. Cl. .................................................. 260/328
[51] Int. Cl. ........................ A61k 27/00, C07d 65/18
[58] Field of Search .................................... 260/328

[56] References Cited

UNITED STATES PATENTS 2,884,300   4/1959   Braun et al. ........................ 8/55
3,530,116   9/1970   Engelhardt et al. ....260/239.3

FOREIGN PATENTS OR APPLICATIONS 781,558   8/1957   Great Britain ............. 260/328

*Primary Examiner*—Henry R. Jiles
*Assistant Examiner*—Cecilia M. Shurko
*Attorney*—Thomas E. Arther, Harry E. Westlake, Jr. and I. Louis Wolk

[57] ABSTRACT

This invention pertains to pharmacologically active compounds of the following structure:

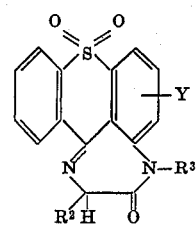

wherein Y is hydrogen, halo, alkyl, $NO_2$, perfluoroalkyl, cyano, PO—, $RSO_2$—, $R_2NSO_2$—, $R_2NCO$— (R being alkyl, aryl, aralkyl, alkaryl or hydrogen); and $R^2$ is alkyl, aryl, aralkyl, alkaryl or hydrogen and $R^3$ is alkyl, aralkyl or hydrogen. The disclosed process is summarized in the flow sheet at pages 2–3 of the specification. The compounds exhibit anti-anxiety activity and a depressant effect on the central nervous system.

9 Claims, No Drawings

THIAXANTHONE-10,10-DIOXIDES

This application is a division of application, Ser. No. 661,784, filed Aug. 21, 1967, now U.S. Pat. No. 3,530,116.

FIELD OF THE INVENTION

This invention relates to novel diazepines. More particularly, this invention relates to a class of diazepines having the diazepine moiety fused to a thiaxantheno tricyclic ring system.

BRIEF SUMMARY OF THE INVENTION

The novel compounds of this invention can be represented by Formula I:

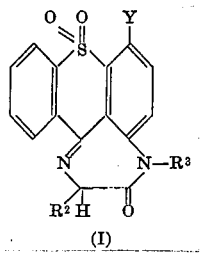

(I)

wherein Y is hydrogen, halo, alkyl, $NO_2$, perfluoroalkyl, cyano, RO—, $RSO_2$—, $R_2NCO$—, (R being alkyl, aryl, aralkyl, alkaryl, or hydrogen); and $R^2$ is alkyl, aryl, aralkyl, alkaryl or hydrogen and $R^3$ is alkyl, aralkyl or hydrogen.

The compounds of this invention are pharmacologically active substances having useful pharmacodynamic properties. Thus in animals they exhibit antianxiety activity and a depressant effect on the central nervous system.

DETAILED DESCRIPTION OF THE INVENTION

The compounds of this invention are prepared from starting materials which are either well known or which are all themselves prepared from readily available compounds according to procedures apparent to the art-skilled. The general procedures for obtaining compound I are outlined in steps (A) through (E).

In the following reaction sequence $R^2$ and Y are as previously defined; $R^1$ is alkyl, aralkyl or alkaryl; X is halo; $X^1$ is chlorine or bromine, and $X^2$ is chlorine, bromine or iodine. It is preferred that the alkyl groups be lower alkyl (i.e., methyl, ethyl, n-propyl, i-propyl, n-butyl, t-butyl, sec-butyl). Usually the aryl moiety is mononuclear, e.g., phenyl; but polynuclear aryls, such as napthyl, phenanthryl, anthryl, etc. are within the contemplation of this invention. Preferably the aralkyl, alkaryl, and aryl moieties contain up to about ten carbons. It is also preferred that the halogen be chlorine or bromine.

A

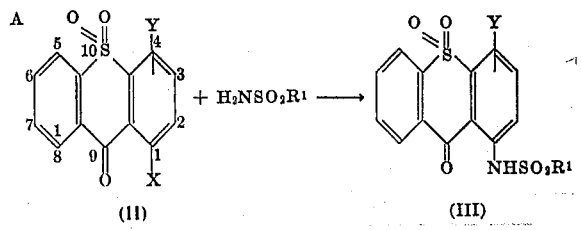

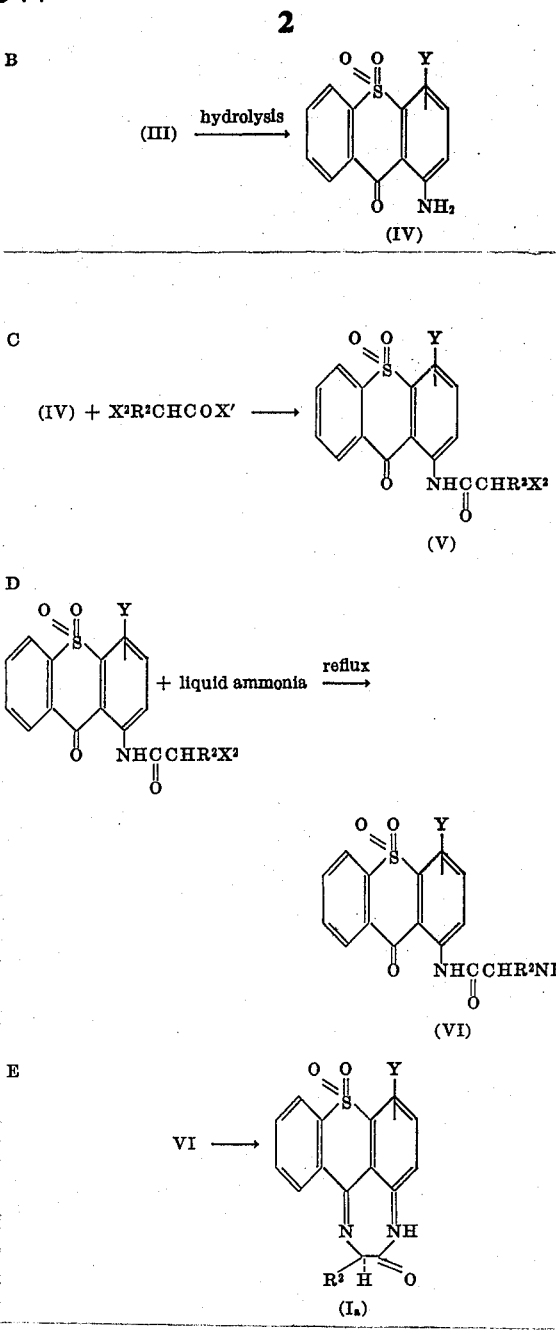

Step A involves the replacement of the 1-halo substituent with a substituted sulfonyl amino group having the general formula $H_2N SO_2R^1$ (wherein $R^1$ is as previously defined). Generally this reaction step is carried out in an inert high boiling solvent preferably having a boiling point from about 180° C. to about 250° C., such as nitrobenzene, and using a catalytic agent, such as copper powder, which is the conventional reagent, in the presence of bases, such as sodium acetate, potassium acetate, alkali metal carbonates and other similar weak bases.

Step B This step comprises a conventional hydrolysis in the presence of a strong acid, such as sulfuric acid, and is generally carried out by dissolving the sulfonamide derivative (III) in the heated sulfuric acid followed by quenching in ice. Other strong acids can be employed such as phosphoric and concentrated hydrochloric acid.

Step C Following hydrolysis, the amine (IV) is reacted with an alpha-halo acyl halide of the formula $X^2R^2CHCOX'$ ($X^1$, $X^2$ and $R^2$ are as previously defined). This acylation step involves various methods for removal of the hydrogen halide that is formed, such as combining with a base, such as pyridine, or expelling it as a gas. Various inert organic solvents can be employed. Where pyridine is utilized as the receptor for the hydrogen halide, ether can be employed as a solvent, for example. Where the halide is expelled as a gas, the reaction can be carried out in a solvent, such as benzene, toluene and a wide variety of other inert organic solvents. When an organic base is utilized to neutralize the hydrogen halide, at least one equivalent of the organic base should be employed as the receptor in order to remove all of the hydrogen halide being given off in the reaction and thereby avoid the formation of quaternary salts. The amination is effected by suspending (V) in liquid ammonia and allowing it to reflux under stirring for a sufficient period of time to allow the reaction to proceed to completion. This can be a matter of from one hour to a day.

Step E This conventional condensation proceeds straightforwardly. For example, where Y is methyl, all that is necessary to effect the condensation and ring closure is melting the crystalline material (VI). In other instances, it may be necessary to effect the reaction under refluxing conditions in such solvents as pyridine and the like. The duration of the reaction depends upon the molecule employed and can be anywhere from a matter of hours to a matter of days for completion.

The foregoing reaction sequence produces compounds of the Formula (I) wherein $R^3$ is hydrogen. (Designated In the above reaction sequence). To prepare compounds wherein $R^3$ is alkyl or aralkyl, introduction of such a $R^3$ group into the benzodiazepin Ia can be accomplished according to the method of L. H. Sternback, et al., J. Org. Chem. 27, 3788 (1962) and can be represented by the following reaction sequence:

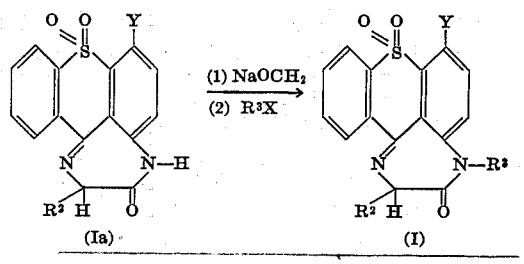

wherein $R^2$ and $R^3$ are as defined previously. Thus it can be seen that the foregoing reaction involves the preparation of the sodio derivative of Ia by reaction of Ia with sodium methoxide in a solvent such as dimethylformamide, followed by treatment of this sodio derivative with the alkylating agent, $R^3X$, wherein X is a halide, preferably chloride, bromide, iodide, or sulfate or the like conventional alkylating agent to give I. Exemplary of these alkylating agents are methyl iodide, ethyl chloride, propyl bromide, butyl iodide, dimethyl sulfate, diethyl sulfate, dibutyl sulfate, benzyl, chloride, and the like.

EXAMPLE I 1,4-Dichlorothiaxanthone-10,10-dioxide 1,4-Dichlorothiaxanthone (5.5 g.) is suspended in 40 ml. of glacial acetic acid. The mixture is stirred while 4 ml. of 30 percent hydrogen peroxide is added. The mixture is heated to reflux at a gentle boil for one hour and then allowed to cool overnight.

The next morning the mixture is cooled in an ice bath and filtered. The precipitate is washed with 25 ml. of acetic acid and dried overnight at 65°. The mother liquor from the filtration is diluted with 50 ml. of water and the mixture cooled overnight. The precipitated crystals are filtered, washed with acetic acid and dried in a similar manner. The product after recrystallization from glacial acetic acid melts at 183.6° to 185° C. and is 1,4-dichlorothiaxanthone-10,10-dioxide.

EXAMPLE II

A. 1-p-Toluenesulfonamido-4-chlorothiaxanthone-10,10-dioxide

Into a flask fitted with a stirrer and a condenser topped with a calcium chloride drying tube is charged 100 mg. of copper powder, 8.35 g. of paratoluenesulfonamide, 4.05 g. of anhydrous potassium acetate, 10.16 g. of 1,4-dichlorothiaxanthone-10,10-dioxide and 60 ml. of nitrobenzene. The mixture is stirred at gentle reflux for 10 hours and then allowed to cool. The nitrobenzene is steam distilled out and the residue is filtered from the boiling water. The residue is ground to a powder and recrystallized once from acetic acid. The product is dried and found to melt at 199°–205° C.

B. 1-Amino-4-chlorothiazanthone-10,10-dioxide 1-p-Toluenesulfonamido-4-chlorothiaxanthone-10,10-dioxide (2 g.) is placed in a 50 ml. flask fitted with a magnetic stirrer and a drying tube. 20 ml. of concentrated sulfuric acid is added and the mixture is heated on a steam bath for one hour, after which it is cooled to room temperature and drowned in 200 ml. of water. The mixture is diluted with 10-normal sodium hydroxide until quite basic (pH 9–10) and the product is isolated by filtration and washed with water and dried. After two recrystallizations from benzene the product melts at 214.5°–217° C.

C. 1-Bromoacetamido-4-chlorothiaxanthone-10,10-dioxide

Into a flask fitted with a reflux condenser and a drying tube is charged 0.285 g. of dry pyridine, 1.025 g. of 1-amino-4-chlorothiaxanthone-10,10-dioxide, 0.725 g. of bromoacetylbromide and 100 ml. of dry ether. The mixture is stirred for 24 hours and then filtered. The precipitate is washed with ether and then with water after which it is suspended in 200 ml. of water, filtered, and washed with ether. After the product is dried it melts at 208°–210.5° C. with softening at 195°–202° C.

D. 1-Aminoacetamido-4-chlorothiaxanthone-10,10-dioxide

Into a flask fitted with a stirrer, gas inlet and dry ice condenser is charged 1.09 g. of 1-bromoacetamido-4-chlorothiaxanthone-10,10-dioxide and 100 ml. of liquid ammonia is condensed into the flask. The mixture is then stirred for 6 hours after which the ammonia is allowed to evaporate. Water is then added and the mixture is stirred for 2 hours. The precipitate is filtered off and is washed with water. After drying the product is recrystallized from benzene to produce 1-aminoacetamido-4-chlorothiaxanthone-10,10-dioxide, m.p. 199-200°C. Anal. Calc'd for $C_{15}H_{11}ClN_2O_4S$ (350.80): C, 51.36; H, 3.16; Cl, 10.10; S, 9.14. Found: C, 51,57; H, 3.33, Cl, 9.90; S, 9.18.

E. 7-Chloro-3(4H)-oxo-2H-thiaxanthono (9,9a,1-ef)-1,4-diazepin-8,8-dioxide

A solution of 0.86 g. of 1-aminoacetamido-4-chlorothiaxanthone-10,10-dioxide and 10 ml. of pyridine is stirred magnetically and refluxed for 96 hours. The solution is evaporated to dryness in vacuo and the residue is co-evaporated with chloroform. The crude solid product is recrystallized several times from a mixture of water and dimethylformamide to give orange crystals of 7-chloro-3(4H)-oxo-2H-thiaxantheno (9,9a,1-ef)1,4-diazepin-8,8-dioxide, m.p. 288.7°–289.7°C.

Anal. Calc'd for $C_{15}H_9ClH_2O_3S$ (332.78): C, 54.14; H, 2.73; Cl, 10.65; S, 9.64. Found: C, 54.10; H, 3.03; Cl, 10.52; S, 9.60.

EXAMPLE III

A. 1-p-Toluenesulfonamido-4-methylthiaxanthone-10,10-dioxide

Copper powder (167 mg.), 7.11 g. of anhydrous potassium acetate, 14.70 g. of p-toluenesulfonamide, 106 ml. of nitrobenzene, and 16.77 g. of a mixture of 1-chloro-4-methylthiaxanthone-10,10-dioxide and 1-methyl-4-chloro-thiaxanthone-10,10-dioxide [F. Ullmann and D. von Glenck, Ber., 49, 2487 (1916)] were added into a reaction flask provided with means for stirring, heating and refluxing. The mixture was heated to reflux for 10 hours, after which the reaction mixture was steam distilled to remove nitrobenzene. The hot water was decanted from a gummy brown pot residue. This residue was triturated with 100 ml. of hot glacial acetic acid to induce crystallization. The crystalline material was removed by filtration and washed with 200 ml. of glacial acetic acid. By fractional crystallization from glacial acetic acid, the unreacted 1-methyl-4-chlorothiaxanthone-10,10-dioxide was removed and 12.4 g. of 1-(p-toluenesulfonamido)-4-methylthiaxanthone-10,10-dioxide was obtained as small yellow-brown needles, m.p. 203.2°–204.2° C. Anal. Calc'd for $C_{21}H_7NO_5S_2$ (427.48): C, 59.00; H, 4.01; S, 15.00. Found: C, 58.98; H, 4.19; S, 15.01.

B. 1-Amino-4-methylthiaxanthone-10,10-dioxide 1-(p-Toluenesulfonamido)-4-methylthiaxanthone-10,10-dioxide (12.21 g.) produced in step (A) and 130 ml. of concentrated sulfuric acid was placed in a 300 ml. reaction flask provided with a calcium chloride drying tube and magnetic stirrer. The mixture was heated on the steam bath for 1 hour while stirring, and then cooled to room temperature. The solution was then poured onto 1,300 ml. of ice and water. The mixture was stirred and made basic by addition of 520 ml. of 10 N sodium hydroxide. The yellow precipitate was removed by filtration, collected, washed by suspension in 1 liter of water, and filtered. The dried product weighed 7.71 g. Recrystallization from benzene gave a red product identified as 1-amino-4-methylthiaxanthone-10,10-dioxide, m.p. 191°–192°C. Anal. Calc'd for $C_{14}H_{11}NO_3S$ (273.30): C, 61.52; H, 4.06; S, 11.73. Found: C, 61.79; H, 3.92; S, 11.64.

C. 1-Bromoacetamido-4-methylthiaxanthone-10,10-dioxide

Into a 100 ml. flask equipped with magnetic stirrer and condenser with a calcium chloride drying tube was placed 1.00 g. of 1-amino-4-chlorothiaxanthone-10,10-dioxide, 0.305 g. of pyridine, 75 ml. of ether, and 0.811 g. of bromoacetyl bromide. A yellow precipitate formed immediately and the orange crystals of starting material disappeared. The mixture was stirred overnight. The yellow precipitate was filtered off and washed with water and ether, collected and dried. Purification by recrystallization from benzene gave 1-bromoacetamido-4-methylthiaxanthone-10,10-dioxide, m.p. 199°–200° C. Anal. Calc'd for $C_{16}H_{12}BrNO_4S$ (394.27): C, 48.75; H, 3.07; Br, 20.27; S, 8.13. Found: C, 49.11; H, 3.09; Br, 20.58; S, 8.18.

D. 1-Aminoacetamido-4-methylthiaxanthone-10,10-dioxide

Into a flask fitted with a stirrer, gas inlet and dry ice condenser was charged 0.50 g. of 1-bromoacetamido-4-methylthiaxanthone-10,10-dioxide from part (C) and approximately 100 ml. of liquid ammonia was condensed into the flask. The mixture was stirred for a minimum of 4 hours after which the ammonia was allowed to evaporate. To the yellow residue was added 150 ml. of water and the mixture stirred to dissolve the ammonium bromide by-product. The mixture was filtered and the yellow product washed well with water, collected, and dried to give 0.35 g. of product melting at 167°–171° C., resolidifying at about 175°–180° C. and remelting at 289°–292° C. (dec.).

E. 7-Methyl 3-(4H)-oxo-2H-thiaxantheno (9,9a,1-ef)-1,4-diazepin-8,8-dioxide

1-Aminoacetamido-4-methylthiaxanthone-10,10-dioxide (200 mg.) was placed in a flask and immersed in a Wood's metal bath at 180°–185° C. for 15 minutes. The solid melted and then quickly re-solidified. This solid was purified by recrystallization from a mixture of water and dimethylformamide to give 7-methyl-3(4H)-oxo-2H-thiaxantheno (9,9a,1-ef)-1,4-diazepin-8,8-dioxide as tiny orange plates, m.p. 292°–294° C. (dec.). Anal. Calc'd for $C_{16}H_{12}N_2O_3S$ (312.36): C, 61.53; H, 3.87; N, 8.97; S, 10.26. Found: C, 61.53; H, 3.97; N, 8.88; S, 10.38.

Using the appropriate starting compounds, the following products of Steps A through E are also prepared as above described:

STEP A

| Ex. | Formula (II) | | | $H_2NSO_2R^1$ | Product (III) | |
|---|---|---|---|---|---|---|
| | X | Y | | $R^1$ | Y | $R^1$ |
| 4 | Br | $CH_3O$ | | p-tolyl | $CH_3O$ | p-tolyl |
| 5 | I | $NO_2$ | | ethyl | $NO_2$ | ethyl |
| 6 | F | $CF_3$ | | $CH_3$ | $CF_3$ | $CH_3$ |
| 7 | Cl | H | | benzyl | H | benzyl |
| 8 | Cl | $CH_3SO_2$ | | $CH_3$ | $CH_3SO_2$ | methyl |
| 9 | Cl | $(CH_3)_2NSO_2$ | | p-tolyl | $(CH_3)_2NSO_2$ | p-tolyl |
| 10 | Br | $(CH_3)_2NCO$ | | $CH_3$ | $(CH_3)_2NCO$ | $CH_3$ |
| 11 | Cl | CN | | n-propyl | CN | n-propyl |
| 12 | Cl | Br | | $CH_3$ | Br | $CH_3$ |

STEP B

| Example | Formula III | | Product IV |
|---|---|---|---|
| | Y | R' | Y |
| 12 | $CH_3O$ | p-tolyl | $CH_3O$ |
| 13 | ethoxy | ethyl | ethoxy |
| 14 | $NO_2$ | $CH_3$ | $NO_2$ |
| 15 | ethyl sulfonyl | benzyl | ethyl sulfonyl |
| 16 | $(C_2H_5)_2NSO_2$ | t-butyl | $(C_2H_5)_2NSO_2$ |
| 17 | $(CH_3)_2NCO$ | $ch_3$ | $(CH_3)_2NCO$ |
| 18 | CN | i-propyl | CN |

STEP C

| Ex. | FORMULA IV Y | X¹C | X²R²CHCOX' X² | R² | PRODUCT V Y | X² | R² |
|---|---|---|---|---|---|---|---|
| 26 | propoxy | Cl | Cl | ethyl | propoxy | Cl | ethyl |
| 27 | butoxy | Br | Br | butyl | butoxy | Br | butyl |
| 28 | Cl | Cl | Br | phenyl | Cl | Br | phenyl |
| 29 | $NO_2$ | Cl | Cl | p-tolyl | $NO_2$ | Cl | p-tolyl |
| 30 | propylsulfonyl | Cl | Cl | benzyl | propylsulfonyl | Cl | benzyl |
| 31 | $(C_2H_5)_2NSO_2$ | Cl | I | H | $(C_2H_5)_2NSO_2$ | I | H |
| 32 | $(C_2H_5)_2NCO$ | Cl | Cl | propyl | $(C_2H_5)_2NCO$ | Cl | propyl |
| 33 | CN | cl | Cl | $CH_3$ | CN | Cl | $CH_3$ |

STEP D

| Ex. | FORMULA V Y | X² | R² | FORMULA VI Y | R² |
|---|---|---|---|---|---|
| 34 | propoxy | Cl | $CH_3$ | propoxy | $CH_3$ |
| 35 | butoxy | Br | ethyl | butoxy | ethyl |
| 36 | Cl | Br | butyl | Cl | butyl |
| 37 | $NO_2$ | Cl | phenyl | $NO_2$ | phenyl |
| 38 | propylsulfonyl | Cl | p-tolyl | propylsulfonyl | p-tolyl |
| 39 | $(C_2H_5)_2$-$NSO_2$ | I | H | $(C_2H_5)_2$-$NSO_2$ | H |
| 40 | $(C_2H_5)_2$-$NCO$ | Cl | propyl | $(C_2H_5)_2$-$NCO$ | propyl |
| 41 | CN | Br | $CH_3$ | CN | $CH_3$ |

STEP E

| Example | FORMULA VI Y | R² | PRODUCT Ia Y | R² |
|---|---|---|---|---|
| 42 | $CH_3O$ | H | $CH_3O$ | H |
| 43 | $NO_2$ | H | $NO_2$ | H |
| 44 | $CF_3$ | phenyl | $CF_3$ | phenyl |
| 45 | H | $CH_3$ | H | $CH_3$ |
| 46 | $CH_3SO_2$ | $CH_3$ | $CH_3SO_2$ | $CH_3$ |
| 47 | $(CH_3)_2NSO_2$ | H | $(CH_3)_2NSO_2$ | H |
| 48 | $(CH_3)_2NCO$ | benzyl | $(CH_3)_2NCO$ | benzyl |
| 49 | CN | p-tolyl | CN | p-tolyl |
| 50 | Br | H | Br | H |
| 51 | I | $CH_3$ | I | $CH_3$ |
| 52 | F | H | F | H |

The compound of the present invention can be prepared and administered in a wide variety of oral and parenteral dosage forms, singly, or in combination with other coacting compounds. They can, if desired, be associated with a carrier which can be a solid material or a liquid in which the compound is dissolved, dispersed, or suspended. The solid compositions can take the form of tablets, powders, capsules, pills, or the like, preferably in unit dosage forms for simple administration or precise dosages. In general the daily dosages range from about 10 mg. to about 500 mg. The liquid composition can take the form of solutions, emulsions, suspensions, syrups, or elixers. Such conventional solid carriers as sucrose, starches, etc. or liquid vehicles such as non-toxic alcohols, glycerine, or the like, may be thus used.

We claim:
1. A compound of the formula

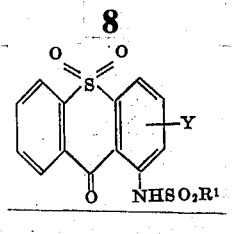

wherein Y is selected from hydrogen, halo, loweralkyl, CN, $NO_2$, trifluoromethyl, loweralkoxy, loweralkyl sulfonyl, diloweralkyl sulfamoyl, and diloweralkyl carbamoyl; and $R^1$ is selected from lower alkyl, benzyl and tolyl.

2. 1-p-Toluenesulfonamido-4-chlorothiaxanthone-10,10-dioxide.

3. 1-p-Toluenesulfonamido-4-methylthiaxanthone-10,10-dioxide.

4. A compound of the formula

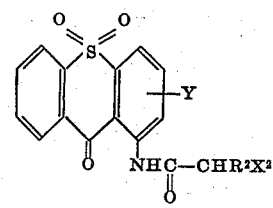

wherein Y is selected from hydrogen, halo, loweralkyl, CN, $NO_2$, trifluoromethyl, loweralkoxy, loweralkyl sulfonyl, diloweralkyl sulfamoyl, and diloweralkyl carbamoyl; $R^2$ is selected from hydrogen, loweralkyl, phenyl, benzyl and tolyl; and $X^2$ is selected from chlorine, bromine and iodine.

5. 1-Bromoacetamido-4-chlorothiaxanthone-10,10-dioxide.

6. 1-Bromoacetamido-4-methylthiaxanthone-10,10-dioxide.

7. A compound of the formula:

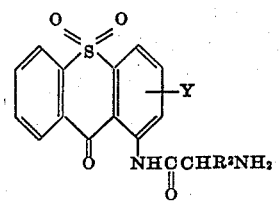

wherein Y is selected from hydrogen, halo, loweralkyl, CN, $NO_2$, trifluoromethyl, loweralkoxy, loweralkyl sulfonyl, diloweralkyl sulfamoyl, and diloweralkyl carbamoyl; and $R^2$ is selected from hydrogen, loweralkyl, phenyl, benzyl and tolyl.

8. 1-Aminoacetamido-4-chlorothiaxanthone-10,10-dioxide.

9. 1-Aminoacetamido-4-methylthiaxanthone-10,10-dioxide.

* * * * *